Feb. 28, 1928.  1,661,144
G. SUNDBACK
SEPARABLE FASTENER SLIDER
Filed Jan. 27, 1925   2 Sheets-Sheet 1
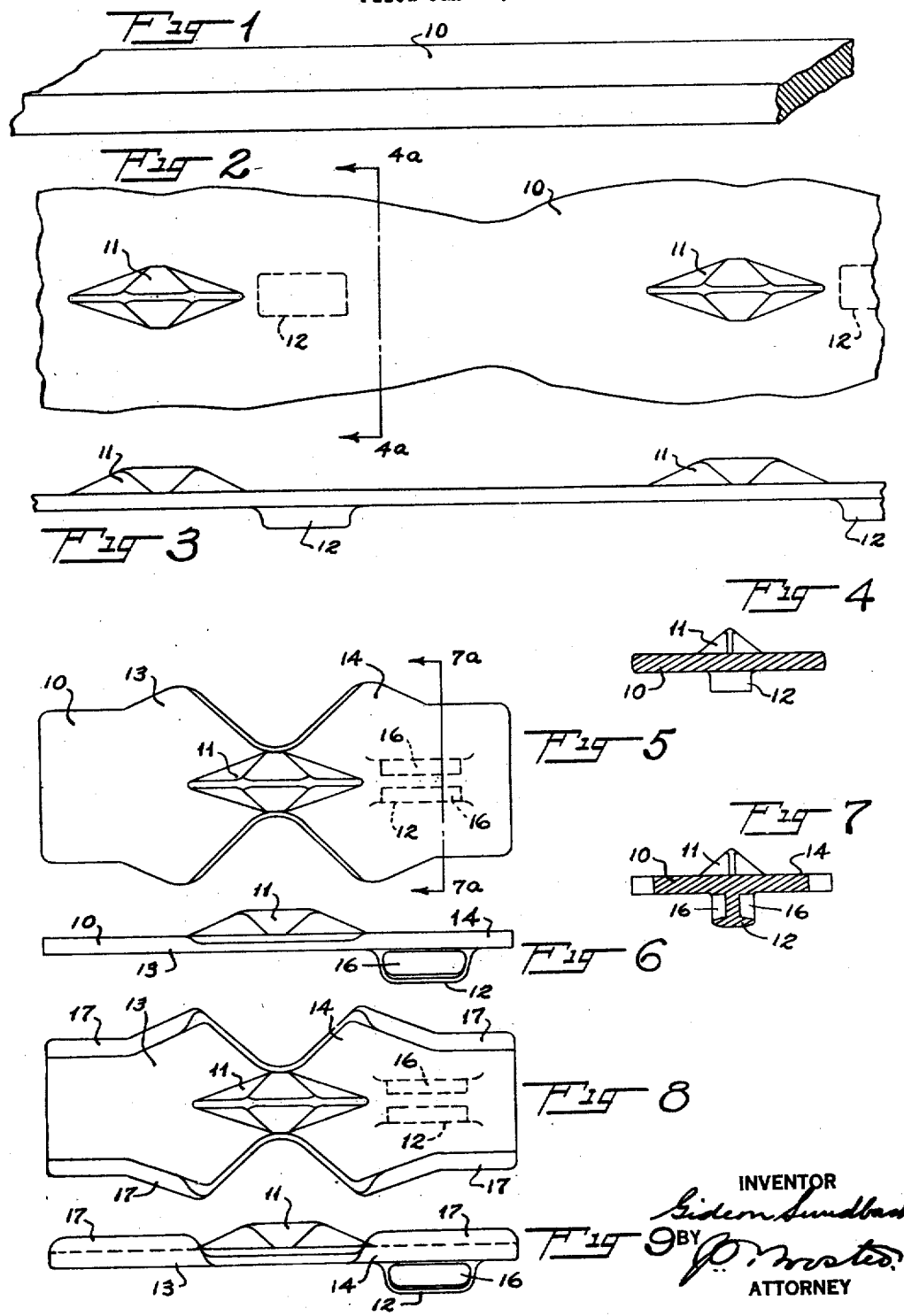

Feb. 28, 1928.
G. SUNDBACK
1,661,144
SEPARABLE FASTENER SLIDER
Filed Jan. 27, 1925
2 Sheets-Sheet 2
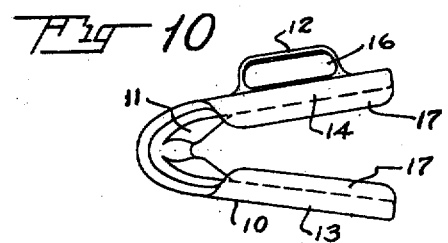
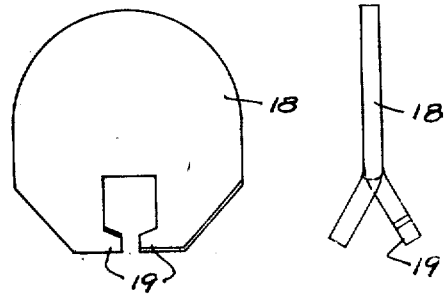
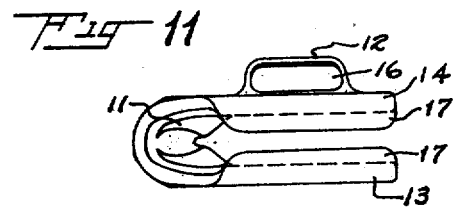
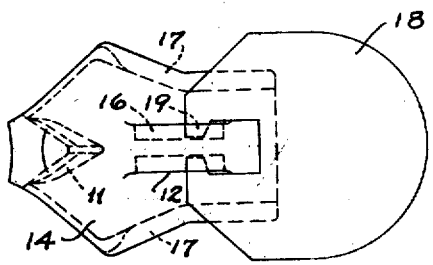
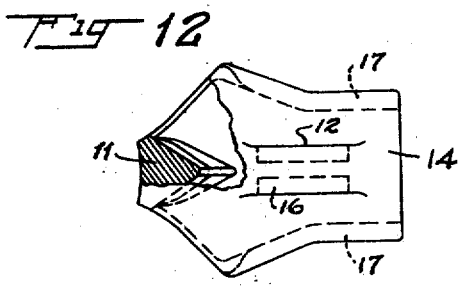
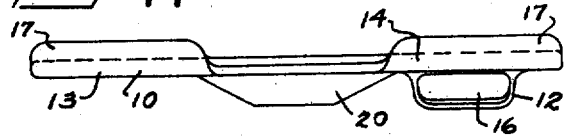
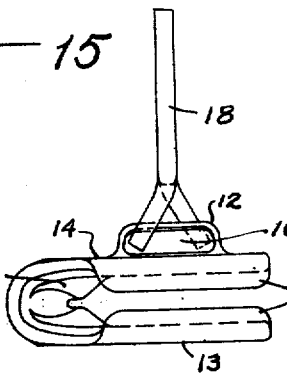
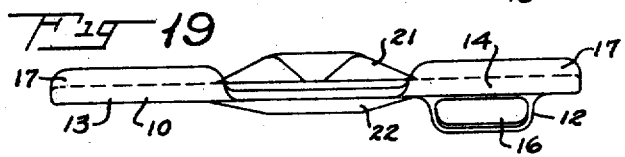
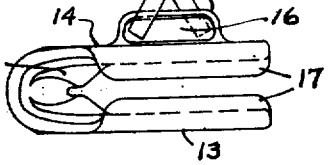
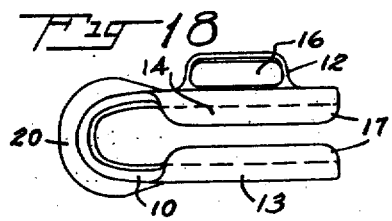
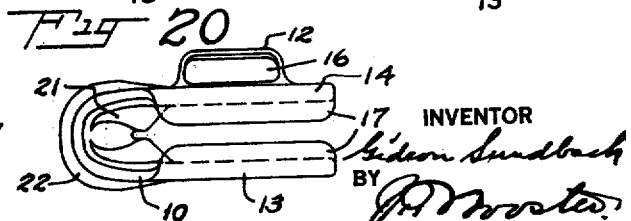
INVENTOR
Gideon Sundback
BY
ATTORNEY Patented Feb. 28, 1928.

1,661,144

UNITED STATES PATENT OFFICE.

GIDEON SUNDBACK, OF MEADVILLE, PENNSYLVANIA, ASSIGNOR TO HOOKLESS FASTENER COMPANY, OF MEADVILLE, PENNSYLVANIA, A CORPORATION OF PENNSYLVANIA.

SEPARABLE FASTENER SLIDER.

Application filed January 27, 1925. Serial No. 5,020.

This invention relates to separable fastener sliders and has for its object to provide a slider, which shall be economical of material, short and compact, yet rigid enough to withstand operating strains, and at the same time adapted to be made of sheet metal in one instead of several parts.

A separable fastener slider is subjected to severe operating stresses tending to spread it, as when closed under strain, and also often tending to contract it, as in a wringer when used on washable goods, or accidentally in other ways, so that if a fastener is to be serviceable, the slider must be rigid.

One type of slider which is made in large quantities for use in edgewise interlocking fasteners consists of sheet metal wings connected by a bent neck. One or both of these wings are usually provided with inturned lateral edges to form the channels and these edge flanges strengthen the wings longitudinally as far as they extend. With sheet metal sliders it is necessary to provide stiffening means for that portion between the bent neck and the outer wing corners, and also to provide actuating means. Such stiffening means has heretofore been a rivet passed through the two wings, or through a neck connecting the wings proper to the bend, or has consisted of a U-shaped stiffener interlocked with the neck, and extending longitudinally of both wings. In riveted sliders, compression is sometimes opposed by an inside spacer. A U-shaped stiffener interlocked with the wing ends opposes both contraction and expansion. The pull is usually attached to the bent neck, or to the U-shaped stiffener.

According to this invention, a sheet metal slider is provided with integral stiffening means which can be either inside or outside the bend, and is preferably inside.

The slider is made short by eliminating the bent neck in favor of a bent thickened reinforce integral with the wings and directly between them, this reinforce connection preferably being V-shaped to provide inner guide surfaces for the divergent channels. This novel integral reinforce stiffens the slider against both expansion and contraction in the most compact manner possible without a special rivet because of bringing the distorting moments closest to the center of the slider. This permits the minimum of metal to be used with maximum strength without any added strengthening part. To enable the actuating device to be attached, one or both wings are provided with an integral projection for attachment of the desired actuating device.

The result of this invention is a less expensive and a stronger, more compact, smooth slider requiring less material than any of equal strength and rigidity ever before made and adapted to be made by automatic machines at minimum cost.

In the accompanying drawings:

Figure 1 shows a strip of metal from which the device is formed.

Fig. 2 shows the first step in the operation,

Fig. 3 is a side view of the device shown in Fig. 2,

Fig. 4 is a section on the line 4ª—4ª of Fig. 2,

Fig. 5 is a plan view of the device after the wings have been formed,

Fig. 6 is a side view of the device of Fig. 5,

Fig. 7 is a section on the line 7ª—7ª of Fig. 5,

Fig. 8 is a plan view of the device of Fig. 5 after the flanges have been formed, Fig. 9 is a side view of the device of Fig. 8, Fig. 10 shows the slider partially bent into position, Fig. 11 shows the slider after having been bent to form, Fig. 12 is a top plan view of the device shown in Fig. 11 and is partly in section, Fig. 13 is one form of pull device for the slider, Fig. 14 is a side view of the device of Fig. 13, Fig. 15 illustrates the manner of attaching the pull device to the slider, Fig. 16 is a plan view of the completed slider with the pull device attached.

Figs. 17 and 18 illustrate a modification having the integral reinforce on the outside of the wings and bend, Figs. 19 and 20 show a construction having the integral reinforce on both the outside and inside of the wings and bend.

The slider of this invention is formed from a strip 10 of metal by forming a thickened portion 11 on one side by flowing the metal, as for example with the aid of dies similar to those employed in coining processes. A projecting lug 12 is similarly formed on the reverse side in about the location and of the shape illustrated. If each side of the slider is to have an actuating device or pull, two of such lugs are formed at proper places on the same side of the strip 10. The wings 13 and 14 of the shape illustrated are next blanked out so as to have them connected by the thickened portion 11. The lug 12 is next recessed, as at 16, on opposite sides by means of punches, (see Figs. 6 and 7). The lateral edges of one or both of the wings 13 and 14 are then bent up to provide flanges 17, as illustrated in Figs. 8 and 9, to guide the slider along the fastener members. Fig. 10 illustrates the next step of bending said wing portions so as to have the thickened part 11 preferably inside the bend and directly between the wings. The wings may be either bent directly to final form, as shown in Fig. 11, or, preferably, the wings are first bent to about the 10° or 20° position shown in Fig. 10, and then subsequently bent to final form, as shown in Fig. 11, over dies or forming tools which finally consolidate and form the integral reinforce 11, and give it the desired guiding surfaces in the channels. During bending reinforce 11 is deformed and compacted. A pull device 18 is blanked out of sheet metal and the attaching projections 19 spread apart, as illustrated in Fig. 14, in order for the pull device to be secured to the lug 12, as illustrated in Fig. 15, by contracting the projections 19. The completed slider is ready for affixing to a fastener after tumbling or other finishing operations. The blanks may be annealed or heat treated, between operations, if necessary, but preferably not after the final bending and forming, as the compressed or compacted metal thus obtained is of maximum stiffness and hardness.

Sheet metal sliders heretofore made have been unduly long due to having a neck extending longitudinally beyond the diverging channels to which a pull device has been connected, or through which the reinforcing means or rivet has been passed. Sometimes an external reinforcing or stiffening means has been used extending along the neck and wings and interlocked therewith. Rivet heads or external stiffening means have caused projections which might tear a fine hose when the fastener is applied to a shoe as well as interfering with and catching upon the contents of various types of bags or receptacles to which the slider is applied.

Under this invention the neck portion is done away with and the wings are joined inwardly directly between the inner sides of the diverging channels with the result that the slider length is materially shortened by the absence of a neck portion. The surface of the slider is smooth and free from any projections or external stiffening means because the reinforce to prevent distortion of the wings is located within the bend and between the wings, is integral with the wings, and extends longitudinally from the bend to about or at least a transverse line connecting the outer wing corners. Since the inturned lateral edge flanges of the wings stiffen them, it will be seen that substantially the entire length of the slider is stiffened by either the reinforce between the wings which extends down to about the space where the other reinforce or flanges begin, or by the flanges. The pull device is preferably attached to a recessed integral compacted lug in about the center of one of the wings. This slider is symmetrically reinforced and both wings equally stiffened. Because the metal of the thickened portion 11 is compacted or compressed both in the coining operation of Fig. 2 and the bending operation of Fig. 11, the slider is more rigid than any previous sliders anywhere near its size.

Instead of the reinforce being located entirely on the inside as is prefereble, Figs. 17 and 18 show a construction in which the reinforce 20 is located entirely on the outside, and Figs. 19 and 20 illustrate a construction in which this stiffening means 21 and 22 is located both upon the inside and exterior, respectively.

The thickened part 11 may be formed in other shapes than that illustrated. The projecting lug 12 may be made as long or short as desired. When made of short length, the pull device will be pivoted therein without having much play, while if desired the lug may be made longer to allow the pull device to be moved from one end of the slider to the other according to the direction in which it is pulled.

The entry of the locking members of a fastener into the diverging channels of the slider is facilitated by having the edge of the mouths of the channels beveled at 23 which is preferably done, as shown in Figs. 8, 17, etc., before the wings are bent.

According to this invention the saving in material over the previously used rivet type slider of equal strength is more than 30% but much greater savings are possible in the number of sliders rejected since a less number of imperfect sliders will be made and therefore the total saving in material will be many times greater.

The novel method and blank disclosed herein are claimed in divisional application Serial No. 179,233, filed March 29, 1927.

I claim:

1. A separable fastener slider comprising overlying wings having means for guiding interlocking members, and an integral thickened portion bent between said wings to hold them in fixed spaced relation.

2. A separable fastener slider comprising overlying wings having means for guiding interlocking members, and an integral thickened portion bent between said wings and formed to provide interior diverging guiding surfaces.

3. A separable fastener slider comprising overlying wings having inturned edges, said wings being inwardly connected to each other, and bent thickened material located directly between the wings and holding the wings in fixed relation and providing interior diverging guiding surfaces.

4. A separable fastener slider comprising overlying wings having means for guiding interlocking members, and an integral thickened portion struck up between said wings and extending longitudinally inside said wings to maintain them in fixed spaced relation.

5. A separable fastener slider comprising overlying wings having means for guiding interlocking members, and a compressed thickened connection located inside said wings to maintain said wings in fixed relation independently of any other wing holding means.

6. A separable fastener slider comprising overlying wings inwardly connected by a bent thickened portion to maintain said wings in fixed spaced relation, parts of said wings and bent thickened portion being deformed to provide diverging channels.

7. A separable fastener slider comprising overlying spaced wings having inturned edges and having an internal reinforcing connection of deformed wing material extending longitudinally along the axis of said slider between said edges.

8. A separable fastener slider comprising overlying spaced wings directly connected by compressed thickened material to maintain the wings in spaced relation, said wings being integrally stiffened by material extending longitudinally of each wing from said wing connection.

9. A separable fastener slider comprising overlying wings having inturned edges, integral thickened wing material bent between said wings to maintain them in fixed spaced relation, and a projection disposed centrally on one wing for attaching actuating means.

10. A slider comprising overlying spaced wings having means for guiding interlocking members, a bend directly connecting said wings, and integral longitudinal stiffening means within said bend shaped to maintain the wings in spaced relation independently of any other wing holding means and extending from said bend down to about a transverse line joining the outer wing corners.

11. A slider comprising overlying wings having means for guiding interlocking members, integral interior stiffening connecting means extending longitudinally part way of the wings to at least a transverse line connecting the outer wing corners, and a pull device secured to the central portion of one wing.

12. A separable fastener slider comprising overlying wings having inturned edges, a bend directly connecting said wings, and a deformed thickened portion struck up between said wings and extending longitudinally from said bend down to at least a straight line joining the outer wing corners.

13. A separable fastener slider comprising overlying wings having inturned edges, an integral reinforcing connection of deformed wing material between said wings to maintain them in fixed spaced relation, and a projection of deformed wing material intermediately disposed on one wing for slidably attaching actuating means.

Signed at Meadville, in the county of Crawford and State of Pennsylvania, this 16th day of January A. D. 1925.

GIDEON SUNDBACK.

ened portion bent between said wings to hold them in fixed spaced relation.

2. A separable fastener slider comprising overlying wings having means for guiding interlocking members, and an integral thickened portion bent between said wings and formed to provide interior diverging guiding surfaces.

3. A separable fastener slider comprising overlying wings having inturned edges, said wings being inwardly connected to each other, and bent thickened material located directly between the wings and holding the wings in fixed relation and providing interior diverging guiding surfaces.

4. A separable fastener slider comprising overlying wings having means for guiding interlocking members, and an integral thickened portion struck up between said wings and extending longitudinally inside said wings to maintain them in fixed spaced relation.

5. A separable fastener slider comprising overlying wings having means for guiding interlocking members, and a compressed thickened connection located inside said wings to maintain said wings in fixed relation independently of any other wing holding means.

6. A separable fastener slider comprising overlying wings inwardly connected by a bent thickened portion to maintain said wings in fixed spaced relation, parts of said wings and bent thickened portion being deformed to provide diverging channels.

7. A separable fastener slider comprising overlying spaced wings having inturned edges and having an internal reinforcing connection of deformed wing material extending longitudinally along the axis of said slider between said edges.

8. A separable fastener slider comprising overlying spaced wings directly connected by compressed thickened material to maintain the wings in spaced relation, said wings being integrally stiffened by material extending longitudinally of each wing from said wing connection.

9. A separable fastener slider comprising overlying wings having inturned edges, integral thickened wing material bent between said wings to maintain them in fixed spaced relation, and a projection disposed centrally on one wing for attaching actuating means.

10. A slider comprising overlying spaced wings having means for guiding interlocking members, a bend directly connecting said wings, and integral longitudinal stiffening means within said bend shaped to maintain the wings in spaced relation independently of any other wing holding means and extending from said bend down to about a transverse line joining the outer wing corners.

11. A slider comprising overlying wings having means for guiding interlocking members, integral interior stiffening connecting means extending longitudinally part way of the wings to at least a transverse line connecting the outer wing corners, and a pull device secured to the central portion of one wing.

12. A separable fastener slider comprising overlying wings having inturned edges, a bend directly connecting said wings, and a deformed thickened portion struck up between said wings and extending longitudinally from said bend down to at least a straight line joining the outer wing corners.

13. A separable fastener slider comprising overlying wings having inturned edges, an integral reinforcing connection of deformed wing material between said wings to maintain them in fixed spaced relation, and a projection of deformed wing material intermediately disposed on one wing for slidably attaching actuating means.

Signed at Meadville, in the county of Crawford and State of Pennsylvania, this 16th day of January A. D. 1925.

GIDEON SUNDBACK.

---

DISCLAIMER 1,661,144.—*Gideon Sundback*, Meadville, Pa. SEPARABLE FASTENER SLIDER. Patent dated February 28, 1928. Disclaimer filed March 13, 1935, by the assignee, *Hookless Fastener Company*.
Hereby enters this disclaimer to claim 10 of the said patent.
[*Official Gazette April 2, 1935.*]

DISCLAIMER 1,661,144.—*Gideon Sundback*, Meadville, Pa. SEPARABLE FASTENER SLIDER. Patent dated February 28, 1928. Disclaimer filed March 13, 1935, by the assignee, *Hookless Fastener Company*.

Hereby enters this disclaimer to claim 10 of the said patent.

[*Official Gazette April 2, 1935.*]